Patented May 1, 1923.

1,453,848

UNITED STATES PATENT OFFICE.

CHOKICHI MATSUOKA, OF LOS ANGELES, CALIFORNIA.

AGAR-AGAR COMPOSITION AND METHOD OF PRODUCING THE SAME.

No Drawing.     Application filed November 17, 1921.   Serial No. 515,816.

*To all whom it may concern:*

Be it known that I, CHOKICHI MATSUOKA, a subject of the Emperor of Japan, residing at Los Angeles, in the county of Los Angeles and State of California, have discovered and invented a new and useful Agar-Agar Composition and Method of Producing the Same, of which the following is a specification.

This invention relates to the art of producing valuable compositions from seaweed and other ingredients and relates more particularly to improvements over my co-pending application for "Process for making agar-agar", filed October 10, 1918, Serial No. 257,673, issuing as a patent December 6, 1921.

The present invention relates to a new composition of matter and the process of preparing the same from seaweed, the same being a porous and gelatinous substance adapted for various industrial purposes, for bacilli cultures, medicinal purposes, and for use as a food and as ingredient of foods.

An object is to reduce agar-agar from the form heretofore known to a powdered form, and an advantage is greater convenience in handling and marketing the same.

I have discovered that it is possible to reduce agar-agar to a powdered form, and to increase the utility of agar-agar by adding sugar thereto and powdering the product.

In preparing this substance I employ the appropriate seaweed gloiapeltis, freshly gathered, and then dried with sun heat under direct exposure to the sun's rays. After thus drying the seaweed, there is added thereto liquid chlorine in the proportions of one part of the same to nine parts of gloiapeltis for bleaching the same. After bleaching, the substance is treated with a ten per cent solution of water and sodium thiosulphate, one part to nine parts of gloiapeltis rendering the substance odorless. The substance is then washed one or more times in pure water and then placed in clear water and boiled at a temperature over one hundred degrees centigrade until a viscid character is assumed, and thereafter is placed on a screen or in a porous cloth, thus filtering or draining the bulk of the viscid substance from lumpy and undissolved portions and sand and similar impurities. The drained product is more or less homogenous in character and colorless and odorless.

When the gelatinous substance cools it forms a more or less hardened substance and is then passed through a sieve or a sausage machine and spread on a tray and then subjected to a low temperature until frozen, being preferably placed in a cold storage or refrigerating device for this operation. The substance is then taken from the cold storage and dried in the sun or by any suitable heating or drying apparatus until thoroughly dry, producing an odorless, porous substance.

If desirable the above-mentioned freezing operation may be omitted and the gelatinous substance after being passed through the sieve or sausage machine and spread on a tray may be dried in the sun or by any suitable heating or drying apparatus. After such drying operation the agar is cut into narrow and long strips and placed in cold water where it remains from three to ten hours or longer for the purpose of further bleaching. A quantity of soda bisulphate in the proportion of one part of soda bisulphate to 100 or more parts water may be used, and will bleach the agar more completely and in a shorter space of time than if just clear water is used. The strips of agar are then taken out of the bleaching bath and are dried in the sun or by any suitable heating or drying apparatus after which the agar attains the form of an extremely thin open-work sheet the meshes of which are transparent.

I then boil sugar and water to the consistency of a free running syrup and dip the thin open-work sheets of agar-agar therein, or as an equivalent spread the syrup thereover with a brush or other means while the syrup is either hot or cold. The boiled sugar is then allowed to dry on the agar-agar and thereby produces a physical and chemical change in the substance whereby the agar-agar becomes very brittle so that it may be then easily powdered by pulverizing means known in the art.

I do not limit myself to the particular seaweed named and I have found that the ordinary agar-agar known in the market as "thread agar", and which is a very tough and rubbery substance can be treated with boiled sugar in practically the manner stated and will become very brittle and easily powdered.

The pulverulent substance thus produced is capable of being more readily handled with accuracy, and can be compactly stored in cans and bottles, and the sweetened product is more highly acceptable on the market than the unsweetened for culinary and other purposes.

It is thus seen that the present invention includes a new manufacture and novel features of operation in connection with operations set forth in said patent application.

I do not claim herein the method set forth in my former application, but wish to be limited to the novelty herein set forth.

I claim.

1. The brittle composition set forth consisting of agar-agar permeated with sugar.

2. The new composition set forth consisting of pulverulent brittle agar-agar permeated with sugar.

3. The process set forth of preparing a product from agar-agar produced by drying a quantity of the appropriate seaweed, adding chlorine thereto until bleached, treating the bleached substance with a solution of sodium thiosulphate, removing the substance from the solution and washing the same in clear water, subjecting the cleansed substance to the action of heated water until a homogenous and viscid mass is obtained, passing such viscid mass through a sieve and spreading such sieved substance on a tray, and drying such sieved substance, which process comprises dipping such dried substance into cold water for the purpose of further bleaching and then drying such bleached substance, thus producing a transparent product.

4. The process set forth of preparing a product from agar-agar produced by drying a quantity of gloiapeltis, adding chlorine thereto until bleached, treating the bleached substance with a solution of sodium thiosulphate, removing the substance from the solution and washing the same in clear water, subjecting the cleansed substance to the action of heated water until a homogenous and viscid mass is obtained, passing such viscid mass through a sieve and spreading such sieved substance on a tray, and drying such sieved substance; which process comprises dipping such dried substance into cold water containing a quantity of sodium bisulphate dissolved therein for the purpose of further bleaching, and then drying such bleached substance, thus producing a transparent product.

5. The process set forth of preparing a product from agar-agar produced by drying a quantity of gloiapeltis, adding chlorine thereto until bleached; treating the bleached substance with a solution of sodium thiosulphate, removing the substance from the solution and washing the same in clear water; subjecting the cleansed substance to the action of heated water until a homogenous and viscid mass is obtained; passing such viscid mass through a sieve and spreading such sieved substance on a tray; drying such sieved substance; which process comprises dipping the dried substance into cold water for the purpose of producing a transparent product; drying such product, coating such dried product with boiled sugar, and drying the sugar coated product.

6. The process of preparing brittle agar-agar consisting of drying a quantity of the appropriate sea-weed, adding chlorine thereto until bleached, treating the bleached substance with a solution of sodium thiosulphate, removing the substance from the solution and washing the same in clear water, subjecting the cleansed substance to the action of heated water until a homogenous and viscid mass is obtained, passing such viscid mass through a sieve and spreading such sieved substance on a tray, drying such sieved substance, dipping such dried substance into cold water for the purpose of further bleaching, then drying such bleached substance and treating such dried bleached substance with sugar whereby such dried bleached mass upon drying after being treated with such sugar becomes brittle so as to be easily reduced to powdered form.

7. The process of powdering agar-agar consisting of coating agar-agar with a syrup made of boiled sugar and water drying such coated agar-agar and pulverizing such coated and dried agar-agar.

In testimony whereof, I have hereunto set my hand at Los Angeles, California, this 12th day of November, 1921.

CHOKICHI MATSUOKA.

Witness:
JAMES R. TOWNSEND.